United States Patent

Casas Gomila et al.

[11] Patent Number: 6,105,458
[45] Date of Patent: Aug. 22, 2000

[54] SHEATH TERMINAL FOR CONTROL CABLES

[75] Inventors: Jordi Casas Gomila; Ramon Morera Milan, both of Barcelona, Spain

[73] Assignee: Fico Cables, S.A., Barcelona, Spain

[21] Appl. No.: 09/308,965

[22] PCT Filed: Nov. 18, 1997

[86] PCT No.: PCT/ES97/00280

§ 371 Date: Aug. 9, 1999

§ 102(e) Date: Aug. 9, 1999

[87] PCT Pub. No.: WO98/25036

PCT Pub. Date: Jun. 11, 1998

[30] Foreign Application Priority Data

Dec. 3, 1996 [ES] Spain ..................................... 9602557

[51] Int. Cl.[7] ....................................................... F16C 1/14
[52] U.S. Cl. ..................... 74/502.4; 74/501.5 R
[58] Field of Search ........................... 74/501.5 R, 500.5, 74/502.4, 502.6

[56] References Cited

U.S. PATENT DOCUMENTS

| | | | |
|---|---|---|---|
| 4,339,213 | 7/1982 | Gilmore | 403/316 |
| 4,763,541 | 8/1988 | Spease | 74/501 R |
| 4,951,524 | 8/1990 | Niskanen | 74/502.6 X |
| 5,272,934 | 12/1993 | Chegash et al. | 74/502.4 |
| 5,280,733 | 1/1994 | Reasoner | 74/501.5 R |
| 5,596,908 | 1/1997 | Hall | 74/502.4 |
| 5,615,584 | 4/1997 | Irish | 74/502.6 |

FOREIGN PATENT DOCUMENTS

| | | |
|---|---|---|
| 627570A1 | 12/1994 | European Pat. Off. . |
| 2261933 | 7/1974 | Germany . |

*Primary Examiner*—Mary Ann Battista
*Attorney, Agent, or Firm*—Sughrue, Mion, Zinn, Macpeak & Seas, PLLC

[57] ABSTRACT

This terminal can be attached to an open cavity (27) of a dividing wall (60) by fixing one sheath end (26) of a control cable formed of a sheathed steel cable (7). The terminal includes a fixing body (1), a terminal body (6) and a retaining body (3) which can be attached to each other coaxially. In order to fix the terminal to the open cavity (27) the terminal further includes a stem (44), a spring (49) and a retaining pin (52) which can be moved by the user and has two working positions: a first position in which the stem (44) can slide in both directions in a fixing cavity (34); and a second position in which the stem (44) is immobilized once its free end (48) is fitted in a fixing orifice (61) of the dividing wall (60).

3 Claims, 2 Drawing Sheets

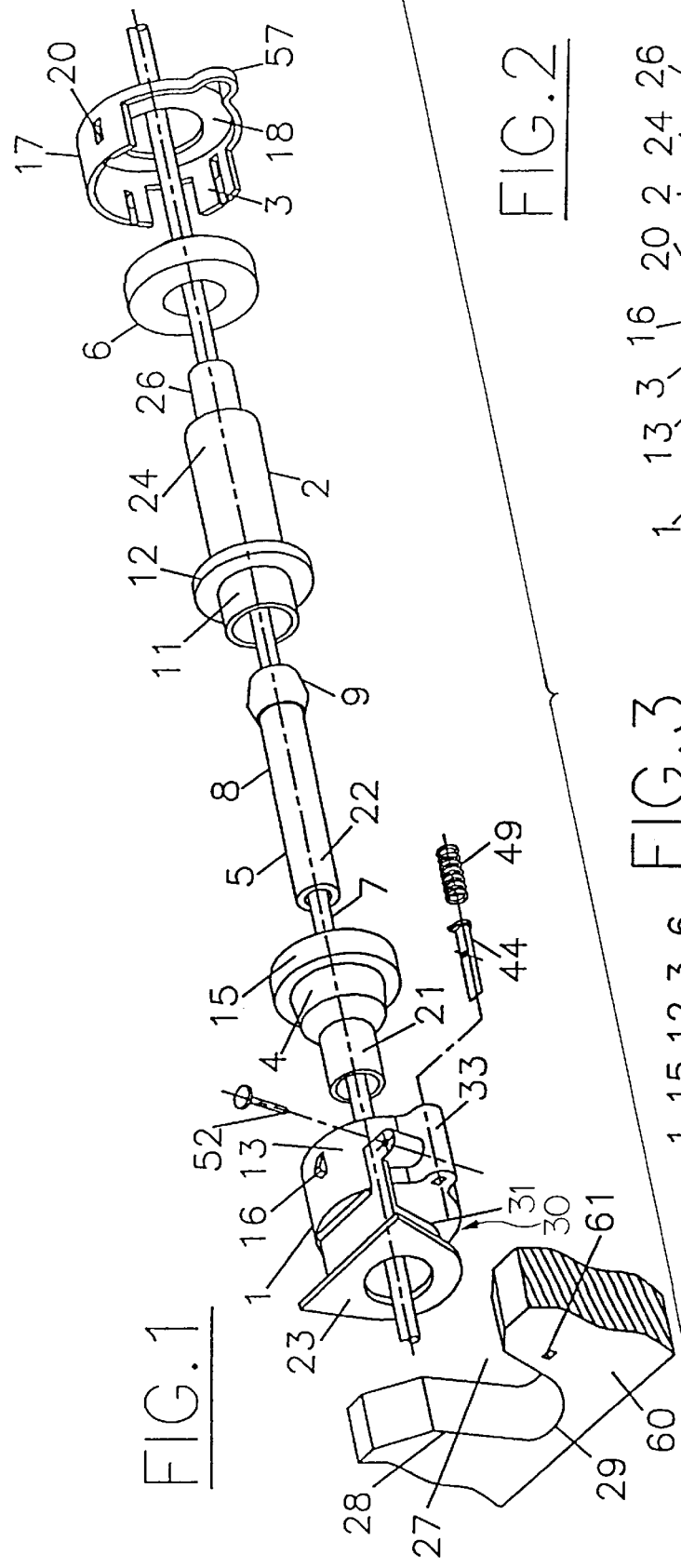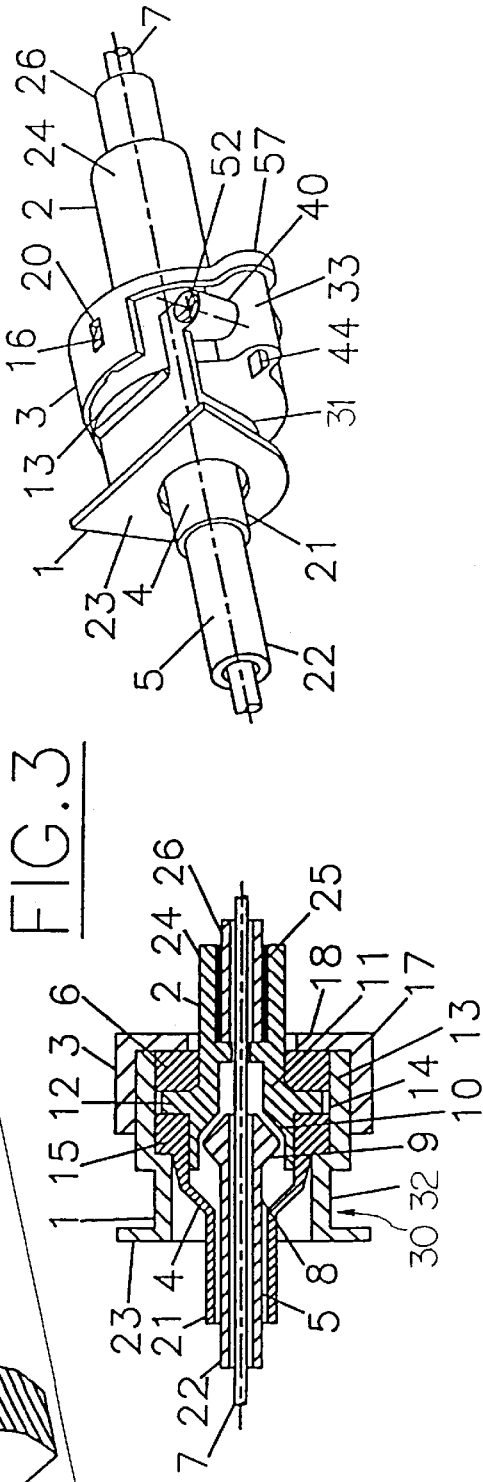

SHEATH TERMINAL FOR CONTROL CABLES

TECHNICAL FIELD OF THE INVENTION

The object of the invention is a sheath terminal for control cables, which is particularly applicable to control cables of the type generally used in the automobile industry.

BACKGROUND OF THE INVENTION

Known in the art are numerous embodiments of control cables which essentially consist in a control cable provided with a sheath in which the ends of the steel cable incorporate a respective steel cable terminal adapted for coupling thereof to an actuating control and to its associated mechanism, while the ends of the sheath incorporate a respective sheath terminal, one or both of which are attached, through fixing means incorporated on the sheath terminal, to fixed points situated along the route of the steel-cable.

Fixing of one of the sheath terminals is frequently implemented on a fixed point of the structure of the vehicle on which the steel cable passes through a dividing wall. Passage of the steel cable through the dividing wall is implemented through a through-orifice which forms a closed cavity or through a gap made on the edge of the dividing wall which forms an open cavity, said cavities being closed or open where the sheath terminal is fixed.

In those cases in which the sheath terminal is fixed to an open cavity, it is usual practice for the fixing means of the sheath terminal to include, along general lines, a tubular body to which is fixed the end of the sheath, which can be attached to the open cavity by means of screws or a body of elastic material. The main disadvantages of such fixing means is that they require long assembly times for fitting the sheath terminal onto the automobile vehicle, which increases production costs, and/or a certain lack of reliability deriving from the fact that, under certain service conditions, for example when the sheath terminal fixing means are subjected to high mechanical stresses arising due to vehicle driving conditions, the sheath terminal can come out of the open cavity leaving the control cable out of service.

Document EP-A-627 570 (VOFA-WERK XAVIER VORBRUGGEN GmbH & Co. Kg, published on Dec. 7, 1994) describes a sheath terminal for control cables which is attachable to a dividing wall. The sheath terminal comprises a fixing body, a terminal body and a retaining body, which are all tubular and coaxially attached to each other, and means for their attachment to a dividing wall, which include annular slots and elastic extensions inwardly extended. The sheath terminal has the drawback in the performance of its fixing means, because once the terminal is attached to a fixing cavity in the dividing wall, if the sheath terminal need to be removed from said retaining cavity for its maintenance or for repairing the vehicle, the elastic nature of the fixing means makes it difficult to carry out said removal.

DESCRIPTION OF THE INVENTION

A sheath terminal for control cables of original structure and operation is made known herein in order to provide a solution to the problems presented by the known embodiments of sheath terminals such as those described above.

The sheath terminal of the invention comprises a tubular fixing body, terminal body and retaining body having open ends provided with respective and complementary mutual coaxial attachment means so adapted that, once attached, the terminal body is fixed between the fixing body and the retaining body, and the steel cable of the control cable can slide freely in both directions through same, while the terminal body has at one of its ends, the front end, fixing means for one sheath end, and the fixing body and the retaining body have respective and complementary fixing means of to an open cavity, characterized in that said fixing means to comprise:

on one end of the fixing body, the rear end, a fixing groove in which there are one or more positioning planes adapted to receive with a snug fit corresponding positioning planes of the open cavity, and at its other end, the front end, and running transversally, a fixing extension on which, running longitudinally with respect to the fixing body, there is a fixing cavity both ends of which, front and rear respectively, are open and have two portions of different cross section and quadrangular outline, the front of larger section and the rear of smaller section, respectively, which fixing extension has mounted transversally a retaining extension provided with an axial retaining orifice which leads into the fixing cavity;

on one of the ends of the retaining body, the front end, a radial fixing extension so adapted that, once the fixing, terminal and retaining bodies have been attached, it closes the front end of the fixing cavity;

a fixing stem which comprises a body having a cross section of quadrangular outline and a thrust head adapted so that they can slide with a snug fit in both directions through the rear and front portions respectively of the fixing cavity, the body of the fixing stem having a retaining orifice and length which permit one of its ends to project from the fixing cavity;

a fixing spring fitted in the fixing cavity, which spring works permanently under compression with one of its ends resting against the radial fixing extension of the retaining body and its other end against the thrust head of the fixing stem, all this so adapted that the body of the fixing stem tends to remain permanently to the exterior of the fixing cavity;

on the dividing wall, and at a relatively short distance from the open cavity, a fixing orifice through which the free end of the fixing stem can slide with a snug fit;

a retaining pin fitted into the axial retaining orifice of the retaining extension and able to slide in both directions, the pin being so adapted that one of its ends, the exterior end, has means for holding by the user, while its other end, the interior end, can be housed with a snug fit in the retaining orifice of the body of the fixing stem, immobilizing it, while the retaining pin and orifice of the retaining extension have respective and complementary positioning means which permit two working positions of the pin to be established:

a first position in which the fixing stem can slide in both directions with its free end projecting from the fixing orifice and the fixing spring having its maximum length, in such a way that attachment of the fixing body to the open cavity leads to the dividing wall pressing upon the free end of the stem and inserting it into the fixing cavity by submitting the spring to greater compression by reduction of its length, this until the fixing orifice of the dividing wall and the stem are facing each-other, at which moment the fixing spring, by elastic reaction, drives the stem whose free end is housed in the fixing orifice; and a second position in which the interior end of the retaining pin is housed in the retaining orifice of the fixing stem, immobilizing it, leaving the position of the sheath terminal fixed in the open cavity due to the combined action of the positioning planes of the open cavity and of the fixing body, and by the free end of the fixing stem housed in the fixing orifice of the dividing wall.

According to another characteristic of the sheath terminal of the invention, the positioning means on the retaining pin comprise an annular positioning projection and, on the retaining orifice of the retaining extension two positioning grooves adapted to receive the annular projection with a snug fit.

According to another characteristic of the sheath terminal of the invention, the coaxial coupling means comprise:

on the terminal body, an exterior, annular retaining projection;

on the front end of the fixing body, to the interior, a retaining cavity adapted to receive with a snug fit the annular retaining projection of the terminal body, and to the exterior, a plurality of coupling projections; and on the front end of the retaining body, to the interior, an annular retaining projection coinciding with that of the terminal body, and to the exterior a plurality of coupling orifices adapted to receive with a snug fit the coupling projections of the fixing body.

BRIEF DESCRIPTION OF THE DRAWINGS

The drawings sheets of the present specification show the sheath terminal of the invention for control cables. In said drawings:

FIG. 1 is a perspective view of the components of the sheath terminal of the invention;

FIG. 2 is a perspective view of the sheath terminal of the invention as supplied ex-works;

FIG. 3 is a longitudinal-section view of the sheath terminal of the invention;

DETAILED DESCRIPTION OF THE EXAMPLE OF EMBODIMENT

Figure 4:
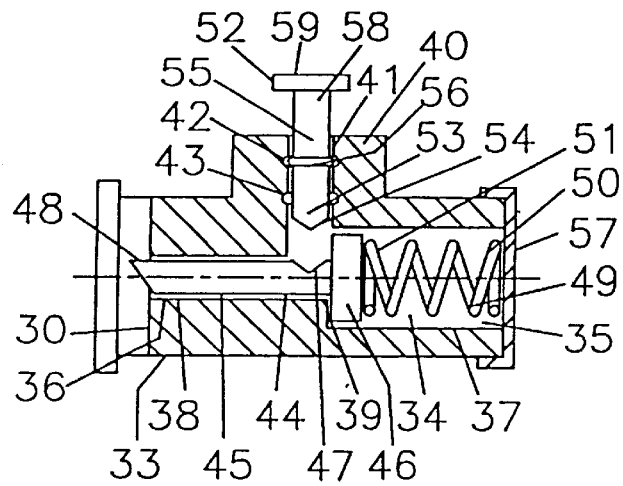
FIG. 4 is a schematic section view of the fixing means of the sheath terminal of the invention as supplied ex-works.

The sheath terminal of the invention for control cables described as an example of embodiment, as shown in perspective view in FIG. 1, comprises a fixing body 1, a terminal body 2, a retaining body 3, a retainer 4, a pin 5 and a damper 6, all of generally tubular shape open at one of their ends and attachable to each other coaxially, so that, as shown in section in FIG. 3, a control cable steel cable 7 can slide freely through them in both directions. FIG. 3 shows how the terminal body 2 is fitted between the fixing 1 and retaining 3 bodies, with the retainer 4 fitted between the terminal 2 and fixing 1 bodies, and the damper 6 being fitted between the terminal 2 and retaining 3 bodies, they being coupled together through respective and complementary coupling means on the fixing bodies 1, terminal 2 and retaining body 3. The pin 5 has on its front end 8 a thickened section of convex outline 9 which is fitted into a semi-spherical cavity 10 made in the rear end 11 of the terminal body 2, with the thickened section 9 and the semi-spherical cavity 10 defining a knuckle joint coupling of the pin 5 and of the terminal body 2 which, by elastic deformation of the retainer 4, permits the pin 5 to rotate, adapting to any changes of direction of the steel cable 7 during operation of the control cable. The sheath terminal arrangement described above is given solely by way of non-restrictive example, for it is understood that the composition of the terminal can be different without this affecting the essential nature of the invention, with the sheath terminal comprising, for example, a terminal body and a retaining body without damping or knuckle joint parts.

The coaxial coupling means comprise the parts detailed below. On the rear end 11 of the terminal body 2, to the exterior, an annular retaining projection 12 shown in FIGS. 1 and 3. On the front end 13 of the fixing body 1, to the interior, a retaining cavity 14 shown in FIG. 3, adapted to receive the retainer 4 with a snug fit through its front end 15, the annular retaining projection 12 and the damper 6, and to the exterior three coupling projections 16, one of which is shown in FIGS. 1 and 2. And, inside the front end 17 of the retaining body 3, an annular retaining spring 18, and to the exterior three coupling orifices 20 shown in FIGS. 1 and 2, adapted to receive with a snug fit the coupling springs 16 of the fixing body 1, as shown in FIG. 2. All this so adapted that when the front end 15 of the retainer 4, the annular retaining projection 12 of the terminal body 2 and the damper 6 are in the retaining cavity 14 of the fixing body 1, as shown in FIG. 3, the fixing body 1 is attached to the retaining body 3 by introducing the projections 16 of the fixing body 1 into the corresponding orifices 20 of the retaining body 3, following double elastic deformation of the latter, as shown in FIG. 2, leaving the terminal body 2 subjected to compression between the front end 15 of the retainer 4 and the damper 6. In this position, the retainer 4 by its rear end 21 and the pin 5 by its rear end 22 project from the rear end 23 of the fixing body 1, while the front end 24 of the terminal body 2 projects with respect to the front end 17 of the retaining body 3.

FIG. 3 shows in section how the front end 24 of the terminal body 2 includes an axial orifice 25 adapted to receive with a snug fit and secure one control cable sheath end 26.

FIG. 1 shows how the sheath terminal of the invention can be coupled to an open cavity 27 made in a dividing wall 60, a-metal plate for example, the cavity 27 having a generally U-shaped outline in which are defined two lateral positioning planes 28, which form a certain exterior-oriented angularity, attached by a linking positioning plane 29.

For attachment thereof to the open cavity 27, the sheath terminal of the invention includes fixing means which will be described below.

The rear end 23 of the fixing body 1 has a fixing groove 30, shown in FIGS. 1, 2 and 3, in which three positioning planes are defined, two lateral 31 and one linking 32, coinciding with the lateral positioning planes 28 and linking plane 29, respectively, of the open cavity 27, with the fixing groove 30 being of sufficient size to receive the open cavity 27 with a snug fit, while on its front end 13 and mounted transversally, the fixing body has a fixing extension 33, shown in section in FIG. 4, on which there is a fixing cavity 34 whose front 35 and rear 36 ends, respectively, are open, the cavity 34 having two section, the front 38 of larger section and rear 38, respectively, linked to define a step 39. Transversally mounted with respect to the fixing extension 33, there is a retaining extension 40 in which there is an axial retaining orifice 41 which leads into the fixing cavity 34, while the orifice 41 has two positioning grooves, first 42 and second 43, respectively, each situated at a relatively short distance from the other.

The front end 17 of the retaining body 3 has a radial fixing extension 57 so adapted that, as shown in FIGS. 2 and 4, once the fixing 1 and retaining 3 bodies have been attached, it closes the front end 35 of the fixing cavity 34.

FIG. 4 shows how the fixing cavity 34 has fitted in it a fixing stem 44 in which there is a body 45 of quadrangular cross section and a thrust head 46, both so adapted as to slide with a snug fit through the rear 38 and front 37 portions, respectively, of the fixing cavity 34 in which the step 39 acts as a stop for sliding of the stem 44, while the body 45 has running transversally a retaining orifice 47 and is of length dimensions such that its free end 48 can&project from the rear portion 38.

In the fixing cavity 34 there is a fixing spring 49 which works permanently under compression and which, as shown in FIG. 4, rests by one of its ends, the front end 50, against the radial fixing extension 57 of the retaining body 3, while its other end, the rear end 51, rests against the thrust head 46 of the fixing stem 44.

FIG. 4 shows how, fitted snugly in the axial retaining orifice 41, there is a retaining pin 52 of circular cross section which can slide in both directions, which retaining pin 52 has on its interior end 53 a conical finish 54 adapted for insertion with a snug fit in the retaining orifice 47 of the fixing stem 44, on its central portion 55 an annular positioning projection 56 adapted for housing with a snug fit in the first 42 and second 43 positioning grooves, fixing the position of the pin 52 by establishing two working positions, first and second respectively, and on its exterior end 58 a head 59 which permits the user to hold the pin 52.

The sheath terminal is supplied ex-works as shown in FIGS. 2, 3 and 4, so that in this position, as shown in FIG. 4, the retaining pin 52 has its positioning projection 56 in the first positioning groove 42, thereby establishing a first working position of the pin 52 in which the free end 48 of the fixing stem 44 projects from the fixing cavity 34.

The functioning of the sheath terminal of the invention for control cables which is described as an example of embodiment is extraordinarily simple and is outlined below.

Figure 5:
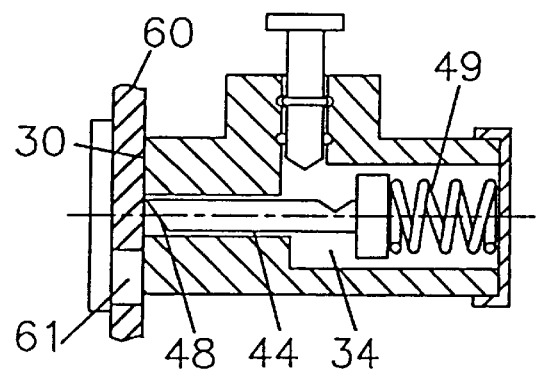
FIGS. 5 and 6 are respective schematic section views of the fixing means during coupling of the sheath terminal of the invention into an open cavity.
Figure 6:
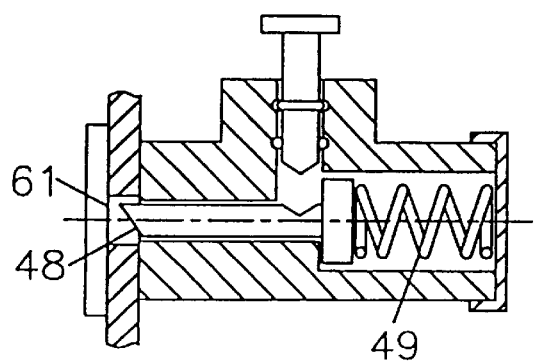
Figure 7:
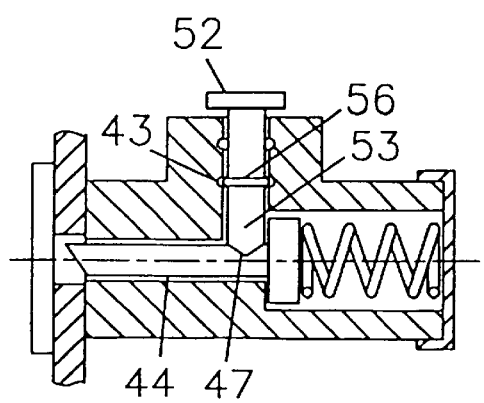
FIG. 7 is a schematic section view of the fixing means once the sheath terminal of the invention has been attached to the open cavity.

Fitting of the sheath terminal in the cavity 27 in the dividing wall 60 simply requires carrying out of the following operations:

firstly, the sheath terminal is so fitted that, with the lateral 28, 31 and linking 29, 32 planes coinciding, which planes are included respectively and complementarily in the open cavity 27 and the fixing body 1, the dividing wall 60 is arranged in the fixing groove 30, in such a way that, as shown in FIG. 5, the dividing wall 60 itself, by pressing on the free end 48 of the stem 44, introduces the latter further into the fixing cavity 34 by submitting the fixing spring 49 to greater compression by shortening its length, and this continues until a fixing orifice 61 in the dividing wall 60 and the free end 48 of the stem 44 are left facing each other, at which moment, as shown in FIG. 6, by elastic reaction of the fixing spring 49 the free end 48 is introduced into the fixing orifice 61; and, the retaining pin 52 is then moved until its positioning projection 56 is housed in the second positioning groove 43 as shown in FIG. 7, in which position the interior end 53 of the pin 52 is introduced into the retaining orifice 47 of the stem 44, immobilizing it.

The combined action of the lateral 28, 31 and linking 29, 32 positioning planes and of orifice 61 and stem 44 fix in highly reliable fashion the position of the sheath terminal in the dividing wall 60.

Where vehicle maintenance or repair needs require that the sheath terminal of the invention be withdrawn from the open cavity 27, the user simply has to move the retaining pin 52 in such a way that its positioning projection 56 is housed in the first positioning groove 42, releasing the stem 44, and then, using any suitable tool the free end 48 of the fixing stem 44 must be pushed and introduced into the fixing cavity 34, while the sheath terminal of the invention which is in the initial position described above is withdrawn from the open cavity 27.

What is claimed is:

1. A sheath terminal for a control cable which can be attached to an open cavity (27) in a dividing wall (60), fixing one steel cable (7) sheath end (26) of the control cable, characterized in that the terminal includes a tubular fixing body (1), terminal body (2) and retaining body (3) having open ends provided with respective and complementary mutual coaxial attachment means so adapted that, once attached, the terminal body (2) is fixed between the fixing (1) and retaining (3) bodies and the steel cable (7) of the control cable can slide freely in both directions through same, while the terminal body (2) has at one of its ends, the front end (24), fixing means for one sheath end (26), and the fixing and retaining bodies have respective and complementary means of fixing to an open cavity (27), which fixing means comprise:

on one end of the fixing body (1), a rear end (23), a fixing groove (30) in which there are one or more positioning planes (31, 32) adapted to receive with a snug fit corresponding positioning planes (28, 29) of the open cavity (27), and at its other end, a front end (13), and running transversally, a fixing extension (33) on which, running longitudinally with respect to the fixing body (1), there is a fixing cavity (34) both ends of which, front (35) and rear (36), respectively, are open and have two portions of different cross section and quadrangular outline, the front (37) of larger section and the rear (38) of smaller section, respectively, which fixing extension (33) has mounted transversally a retaining extension (40) provided with an axial retaining orifice (41) which leads into the fixing cavity (34);

on one of the ends of the retaining body (3), the front end (17), a radial fixing extension (57) so adapted that, once the fixing (1), terminal (2) and retaining (3) bodies have been attached, it closes the front end (35) of the fixing cavity (34);

a fixing stem (44) which comprises a body (45) having a cross section of quadrangular outline and a thrust head (46) adapted so that they can slide with a snug fit in both directions through the rear (38) and front (37) portions respectively of the fixing cavity (34), the body (45) of the fixing stem (44) having a retaining orifice (47) and length which permit its free end (48) to project from the fixing cavity (34);

a fixing spring (49) fitted in the fixing cavity (34), which spring works permanently under compression with one of its ends resting against the radial fixing extension (57) of the retaining body (3) and its other end against the thrust head (46) of the fixing stem (44), all this so adapted that the body (45) of the fixing stem (44) tends to remain permanently to the exterior of the fixing cavity (34);

on the dividing wall (60), and at a relatively short distance from the open cavity (27), a fixing orifice (61) through which the free end (48) of the fixing stem (44) can slide with a snug fit;

a retaining pin (52) fitted into the axial retaining cavity (41) of the retaining extension (40) and able to slide in both directions, the pin (52) being so adapted that one of its ends, an exterior end (58), has means for holding (59) by the user, while its other end, an interior end (53), can be housed with a snug fit in the retaining orifice (47) of the body (45) of the fixing stem (44), while the retaining pin (52) and orifice (41) of the retaining extension (40) have respective and complementary positioning means which permit two working positions of the pin (52) to be established:

a first position in which the fixing stem (44) can slide in both directions with its free end (48) projecting from the fixing cavity (34) and the fixing spring (49) having its maximum length, in such a way that attachment of the fixing body (1) to the open cavity (27) leads to the dividing wall (60) pressing upon the free end (48) of the stem (44) and inserting it into the fixing cavity (34) by submitting the fixing spring (49) to greater compression by reduction of its length, this until the fixing orifice (61) of the diving wall (60) and the stem (44) are facing each other, at which moment the fixing spring (49), by elastic reaction, drives the stem (44) whose free end (48) is housed in the fixing orifice (61); and a second position in which the interior end (53) of the retaining pin (52) is housed in the retaining orifice (47) of the fixing stem (44), immobilizing it, leaving the position of the sheath terminal fixed in the open cavity (27) due to the combined action of the positioning planes (28, 29, 31, 32) of the open cavity (27) and of the fixing body (1), and by the free end (48) of the fixing stem (44) housed in the fixing orifice (61) of the dividing wall (60).

2. A sheath terminal as claimed in claim 1, characterized in that the positioning means on the retaining pin (52) comprise an annular positioning projection (56) and, on the retaining orifice (41) of the retaining extension (40) two positioning grooves (42, 43) adapted to receive the annular projection (56) with a snug fit.

3. A sheath terminal as claimed in claim 1 or 2, characterized in that the coaxial coupling means comprise:

on the terminal body (2), an exterior, annular retaining projection (12);

on the front end (13) of the fixing body (1), to the interior, a retaining cavity (14) adapted to receive with a snug fit the annular retaining projection (12) of the terminal body (2), and to the exterior, a plurality of coupling projections (16); and on the front end (17) of the retaining body (3), to the interior, an annular retaining projection (18) coinciding with that of the terminal body (2), and to the exterior a plurality of coupling orifices (20) adapted to receive with a snug fit the coupling projections (16) of the fixing body (1).

* * * * *